United States Patent
Gautier et al.

(10) Patent No.: US 9,100,376 B2
(45) Date of Patent: Aug. 4, 2015

(54) SYSTEM AND METHOD FOR COMBINING PULL AND PUSH MODES

(75) Inventors: Eric Gautier, Rennes (FR); Willem Lubbers, Cesson Sevigne (FR); François Gerard, Beignon (FR)

(73) Assignee: Thomson Licensing, Issy-les-Moulineaux (FR)

(*) Notice: Subject to any disclaimer, the term of this patent is extended or adjusted under 35 U.S.C. 154(b) by 597 days.

(21) Appl. No.: 12/448,782

(22) PCT Filed: Jan. 11, 2008

(86) PCT No.: PCT/EP2008/050291
§ 371 (c)(1),
(2), (4) Date: Jul. 7, 2009

(87) PCT Pub. No.: WO2008/084096
PCT Pub. Date: Jul. 17, 2008

(65) Prior Publication Data
US 2010/0011088 A1  Jan. 14, 2010

(30) Foreign Application Priority Data
Jan. 12, 2007  (EP) ................................ 07300727

(51) Int. Cl.
*G06F 15/16* (2006.01)
*H04L 29/08* (2006.01)
*H04L 1/18* (2006.01)

(52) U.S. Cl.
CPC .............. *H04L 67/06* (2013.01); *H04L 1/1809* (2013.01); *H04L 67/26* (2013.01)

(58) Field of Classification Search
CPC ............ H04L 65/4076; H04L 65/1016; H04L 65/4084; H04L 67/06; H04L 67/104
USPC ................... 709/201, 217, 218, 219, 231
See application file for complete search history.

(56) References Cited

U.S. PATENT DOCUMENTS

| 6,050,368 A | 4/2000 | Pakarinen et al. |
| 2002/0078186 A1* | 6/2002 | Engel et al. .................. 709/220 |

(Continued)

FOREIGN PATENT DOCUMENTS

| EP | 0817017 | 1/1998 |
| EP | 1248484 | 10/2002 |

(Continued)

OTHER PUBLICATIONS

NTT. Docomo et al; "Point-to-point repair mechanism for MBMS file download service, Tdoc S4-040038", Technical Specification Group Services and System Aspects, Feb. 23, 2004, pp. 1-4, XP002375819.

(Continued)

*Primary Examiner* — Djenane Bayard
(74) *Attorney, Agent, or Firm* — Myers Wolin LLC

(57) ABSTRACT

The present invention concerns a method for downloading content using a combination of push and pull modes. In a communication system comprising a first terminal, at least a second terminal, and a content server, the invention concerns a method for downloading content comprising, at the level of the first terminal, the steps of downloading content either in a pull mode from the content server or at least the second terminal or in a push mode from the content server; and seamlessly switching between the modes for continuing downloading of the content.

9 Claims, 4 Drawing Sheets

(56) References Cited

U.S. PATENT DOCUMENTS

| | | | |
|---|---|---|---|
| 2002/0095399 | A1 | 7/2002 | Devine et al. |
| 2003/0086438 | A1* | 5/2003 | Laumen et al. ............... 370/462 |
| 2005/0223098 | A1* | 10/2005 | Rimac et al. ................. 709/227 |
| 2006/0023732 | A1 | 2/2006 | Vedantham et al. |
| 2006/0107169 | A1* | 5/2006 | Vedantham et al. .......... 714/752 |
| 2006/0200567 | A1* | 9/2006 | Cousins et al. ............... 709/227 |
| 2008/0215747 | A1* | 9/2008 | Menon et al. ................. 709/231 |
| 2010/0011088 | A1 | 1/2010 | Gautier et al. |

FOREIGN PATENT DOCUMENTS

| | | |
|---|---|---|
| EP | 1509049 | 2/2005 |
| EP | 1362311 | 6/2005 |
| EP | 1686748 | 8/2006 |
| EP | 1310073 | 12/2006 |
| EP | 1901525 | 3/2008 |
| EP | 1944944 | 7/2008 |
| JP | 2004080566 | 3/2004 |
| JP | 2006163626 | 6/2006 |
| KR | 19990073129 | 10/1999 |
| KR | 20020033275 | 5/2002 |
| KR | 20020092576 | 12/2002 |
| RU | 2290768 | 12/2006 |
| WO | WO0213487 | 2/2002 |
| WO | WO0237369 | 5/2002 |
| WO | WO03021798 | 3/2003 |
| WO | WO2006000936 | 1/2006 |
| WO | WO2008084096 | 7/2008 |

OTHER PUBLICATIONS

Paila Nokia M Luby Digital Fountain R Lehtonen Teliasonera V Roca Inria Rhone-Alpes R Walsh Nokia T: "FLUTE=File Delivery over Unidirectional Transport", IETF Standard, Internet Engineering Task Force, Oct. 2004, XP015009699.

Chandramouli et al., "Pushing the envelope of pervasive access", Proceedings International Conference on Pervasive Services 2005, Santorini, Greece, Jul. 11, 2005, pp. 291-301.

Chow et al., "Peer-to-peer cooperative caching in a hybrid data delivery environment", Proceedings of the 7th International Symposium on Parallel Architectures, Algorithms and Networks, I-SPAN'04, Hong Kong, May 10, 2004, pp. 79-84.

Elsayed et al., "ATP Autonomous Transport Protocol", Proceeding of the 46th International Midwest Symposium on Circuits and Systems, vol. 1, Cairo, Egypt, Dec. 27, 2003, pp. 436-439.

Huang et al., "Modelling and designing a low-cost high-fidelity mobile crane simulator", International Journal of Human-Computer Studies, vol. 58, No. 2, Feb. 2003, pp. 151-176.

Liu et al., "Enhanced Kepler framework for self-archiving", Proceedings International Conference on Parallel Processing Workshop, Vancouver, Canada, Aug. 2002, pp. 455-461.

Shen et al., "PReCinCt: A Scheme for Cooperative Caching in Mobile Peer to Peer Systems", Proceedings 19th IEEE International Parallel and Distributed Processing Symposium, Denver, Colorado, USA, Apr. 3, 2005, pp. 1-10.

Tanaka et al., "Implementation Issues of a Push Event Delivery Mechanism for Web content service synchronized with TV programs", 8th International Conference on Advanced Communication Technology, Phoenix Park, Korea, Feb. 20, 2006, pp. 1-6.

Zhang et al., "Peer-to-Peer Network for Live Media streaming—using a push-pull approach", 13th Annual ACM International Conference on Multimedia, Singapore, Nov. 6, 2005, pp. 287-290.

Zhao et al., " Gridmedia A Practical Peer to Peer Based Live video streaming system", 2005 IEEE 7th Workshop on Multimedia Signal Processing, Shanghai, China, Oct. 30, 2005, pp. 1-4.

ETSI TS 102 034 V1.2.1, Digital Video Broadcasting (DVB), "Transport of MPEG-2 Based DVB Services over IP Based Networks", Sep. 1, 2009, pp. 1-98.

ETSI TS 102 034 V1.1.1, Digital Video Broadcasting (DVB), "Transport of MPEG-2 Based DVB Services over IP Based Networks", Mar. 1, 2005, pp. 1-91.

Cao et al., "A peer-to-peer approach to task scheduling in computation grid", International Journal of Grid and Utility Computing, vol. 1, No. 1, 2005, pp. 13-21.

Perrot, P. Editor, "Commercial Requirements for downloading IPTV content and management of local storage", DVBCM IPTV Group, Oct. 5, 2006, pp. 1-13.

Gautier et al., "A Model for DVB-IP CDS Content Delivery" Position Paper presented to DVB IP CDS Group, Apr. 25, 2007, pp. 1-20.

* cited by examiner

SYSTEM AND METHOD FOR COMBINING PULL AND PUSH MODES

This application claims the benefit, under 35 U.S.C. §365 of International Application PCT/EP2008/050291, filed Jan. 11, 2008, which was published in accordance with PCT Article 21(2) on Jul. 17, 2008 in English and which claims the benefit of European patent application No. 07300727.0, filed Jan. 12, 2007.

The present invention relates generally to content download and in particular to the use of a combination of pull and push methods.

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A distribution of content between a server and multiple receivers requires either to set up a point to point connection between the server and each receiver, or a multipoint connection. The point to point connection permits to distribute the content in a unicast means to each receiver, and provides a robust distribution; this is called hereafter the pull mode, and usually clients are active initiators. However with a significant number of receivers, it requires a heavy management of all the connections. It may also dramatically enhance the traffic over the network. The multicast distribution provides less network load, with a less robust distribution. This is called hereafter the push mode.

A service operator that manages the server can not precisely predict the behavior of the receivers. In a push content delivery session receivers may be excluded of the complete or partial content download for the following reasons: receivers are switched off during the push distribution; receivers are switched on when the push distribution is ongoing; all the reserved bandwidth is not available for the push distribution, e.g. the STB user is watching a program while recording another; receivers are short of storage space at the time of the push distribution; receivers are using full CPU at the time of the push distribution; networks are not capable of handling multicast traffic; etc. . . . In order to optimize the bandwidth the operator may have to choose either to maintain the push session or to stop it. Stopping the push session allows the operator to liberate the network of a large amount of traffic and the receivers that have missed content can retrieve it using a recovery mode. A recovery method has been defined in the EP patent application number 06291464.3. On the other hand in the pull mode the operator can have to face up to peak demands for content. It can be then more efficient for the operator to optimize the use of the network bandwidth and deployment delay by multicasting this content in push mode rather than using the pull mode.

The present invention concerns a method for efficiently switching between the pull mode and the push mode.

To this end, the invention relates to a method for downloading content, in a communication system comprising a first terminal, at least a second terminal, and a content server. The method comprises, at the level of the first terminal, the steps of downloading content either in a pull mode from the content server or at least the second terminal or in a push mode from the content server; and seamlessly switching between the modes for continuing downloading of the content.

In this context, seamlessly means that the terminal continuously switches from one mode to the other mode, without having to request any further information.

According to an embodiment, the method comprises the step of downloading content in a push mode, and continuing downloading the content in a pull mode when the push mode stops at the content server.

When the operator stops the push session, the terminal continues the download without much interruption. It has got enough information during the push session to switch to and manage the pull downloading mode.

According to another embodiment, the method comprises the step of downloading content in a pull mode, and continuing downloading the content in a push mode when the push mode starts at the content server.

According to an embodiment, the method comprises the step of receiving the push content in a session delivery according to the FLUTE protocol; and receiving information in a File Delivery Table, FDT, during the session delivery allowing to switch to a pull mode.

The FDT comprises additional information necessary to seamlessly switching to the pull mode. When the push mode stops, the terminal does not have to retrieve any further information. It has already received relevant information with the FDT for switching to the pull mode.

According to an embodiment, the method comprises the step of verifying the integrity of the FDT instance; indicating to an indexing server whether the FDT instance has been successfully received or not, and indicating to the indexing server whether the file associated with the FDT instance has been successfully received or not.

According to an embodiment, the method comprises, when detecting a FDT instance that has been corrupted, the step of waiting for the end of file delivery; and performing a FDT instance reparation in a pull mode.

According to an embodiment, the method comprises, when detecting a corrupted complete FDT, the step of waiting for the end of the session delivery; and performing a complete FDT reparation in a pull mode.

According to an embodiment, the method comprises the step of receiving the pull content according to a peer-to-peer protocol; and receiving peer-to-peer meta-information file comprising information allowing switching to a push mode.

The present invention also concerns a terminal comprising means for downloading content in a push mode; means for downloading content in pull mode; and means for seamlessly switching from one mode to the other mode.

Another object of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The invention will be better understood and illustrated by means of the following embodiment and execution examples, in no way limitative, with reference to the appended figures on which:

Figure 1:
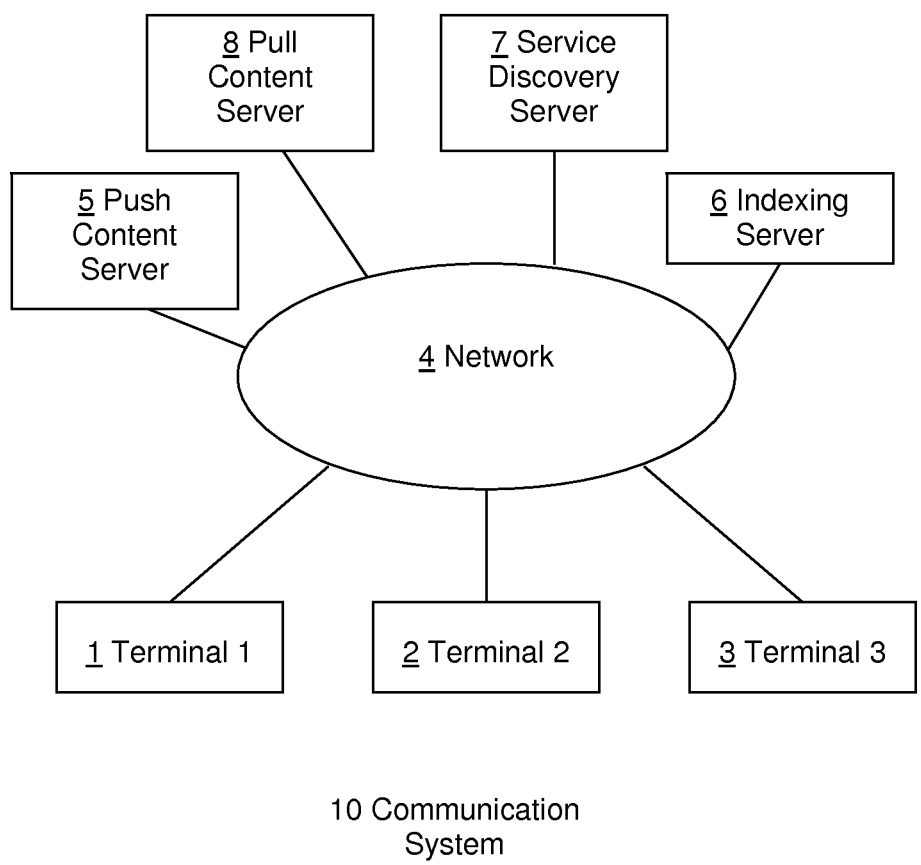
FIG. 1 is a block diagram of a system compliant with the embodiment.
Figure 2:
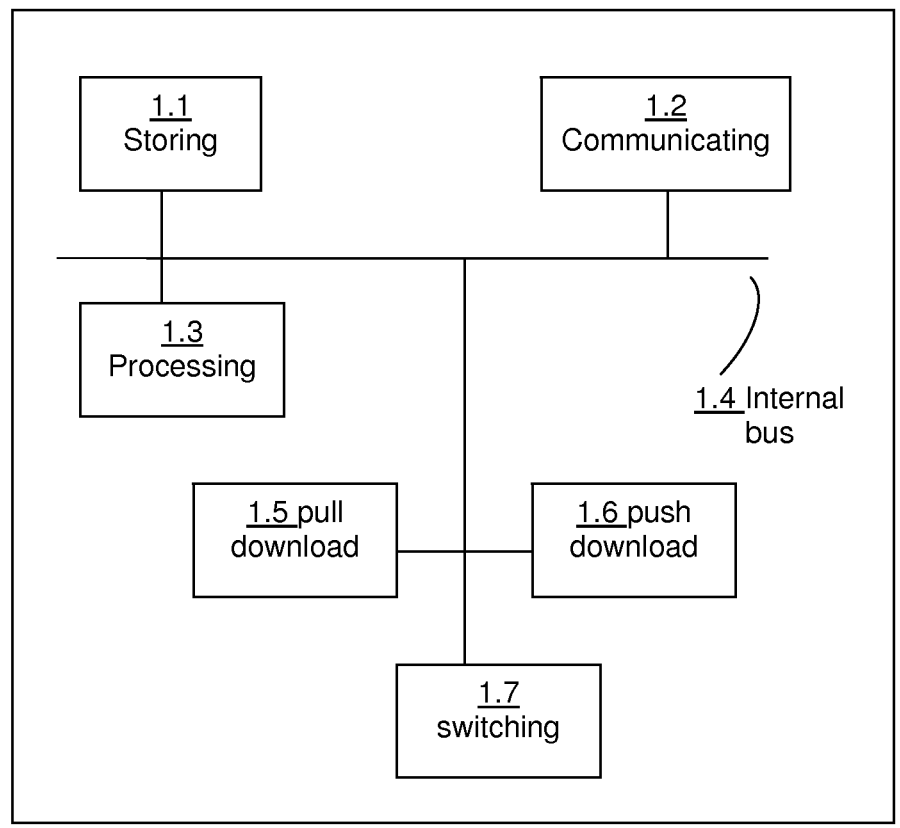
FIG. 2 represent a terminal according to the embodiment.

In FIGS. 1 and 2, the represented blocks are purely functional entities, which do not necessarily correspond to physically separate entities. Namely, they could be developed in the form of software, or be implemented in one or several integrated circuits.

The FIG. 1 represents the architecture of the communication system 10 according to the embodiment for distributing content. The terminals 1, 2, 3 comprise client applications. In particular they comprise the function of a set-top box (STB). In what follows in the embodiment, the terminal is a STB, but the embodiment is not limited to such terminals. It is applicable to a device that comprises a client application for downloading data from a content server.

The terminal also comprises means for downloading content in a push mode and means for downloading content in a pull mode. It performs the pull and push functions as described hereinafter.

The system comprises a push content server 5 and a pull content server 8. The pull content server is adapted to distribute the content in a pull mode. It comprises means for establishing a point to point connection with multiple clients. The push content server is adapted to distribute the content in a push mode. Of course these servers could be comprised into the same device.

The role of the Indexing Server 6 is to put peer STBs into relation with each other to complete repair or retrieve content. The role of the Indexing Server is to put peers needing to recover files, or parts of files, into relation with peers capable of providing the missing information. The Indexing Server does not store any content files, it acts as a centralized index for storing information about the location of files. The pull protocol requires that the Indexing Server is kept informed by each STB of the download status of content. According to the embodiment, the system comprises only one Indexing Server. A network could have several Indexing Servers to optimize access, e.g. per geographical region, or per content type. The same Indexing Server is used in a push mode environment as well as in a pull mode environment.

The service discovery server 7, noted SD&S hereinafter, is adapted to perform the service discovery and selection mechanism, as indicated in ETSI TS 102 034 V1.2.1 (2006-09) Digital Video Broadcasting (DVB), Transport of MPEG-2 Based DVB Services over IP Based Networks standard.

According to the embodiment, the same SD&S server is used in the PUSH mode environment as well as in the PULL mode environment.

FIG. 2 represent the building blocks of a terminal according to the embodiment. The terminal comprises storing means 1.1, communicating means 1.2, processing means 1.3 and an internal bus 1.4. The storing means are intended to store a program that permit the terminal to download the file either in a push or a pull mode. Thus the terminal comprises push downloading means 1.6 and pull downloading means 1.5. It comprises means for switching 1.7 from one mode to the other mode.

The pull method is now described. It is based on a peer-to-peer strategy, noted P2P.

In order to carry out a pull method, the terminal first performs the Indexing Server address discovery phase. A STB finds content for download by browsing a catalog of content available for downloading. The address of the catalog is found using the DVB-IP's Broadband Content Guide Record as specified in the ETSI TS 102 034 V1.2.1 (2006-09) and in the ETSI TS 102539 V1.1.1, Digital Video Broadcasting (DVB); Carriage of Broadband Content Guide (BCG) information over Internet Protocol (IP); which describes the transport and signaling of content guides in the context of DVB-IP. The terminal finds the address of an Indexing Server in the catalog. Of course the address of the Indexing server could be found by other means such as a content download offering record that is delivered by DVB-IP/SD&S signaling.

To improve the capability of downloading large contents, each file of content is split into smaller blocks. The peers are then able to receive and verify the blocks of content and then exchange these blocks before receiving the content completely or partially. A hash code is calculated over each block. The meta-information, as indicated in the table 1, is stored as a file in the Content Server. The meta-information comprises all information necessary to perform a file exchange in peer-to-peer. The hashing operation can be done by the content server.

The following table represents the content meta-information according to the embodiment. The TSI and TOI fields are defined in the FLUTE protocol; they are optional. They are used here to support seamless switching between pull and push modes. The Content-Block-Length, Content-Block-Digests, File-Name, File-Length, File-Digest, File-Block-Length and File-Block-Digests fields are the minimal meta-information necessary for a P2P protocol.

TABLE 1

| Name | Description |
| --- | --- |
| Multi-Files-Attributes | Attributes related to the multi-files |
| Meta-information-length | Size of the meta-information file |
| Content-Type | Files content Type |
| Content-Encoding | Compression |
| Client-Id | To target the content download depending on client identifier (HW, SW, Profile, etc . . .) |
| Content-Block-Length | Size of a block |
| Content-Block-Digests (one per block) | Hash of the blocks (SHA1 . . .) |
| File-Attributes (one per file) | Attributes related to the file itself |
| File-Type | MIME media type of file |
| File-Encoding | Compression |
| Client-Id | To target the file download depending on client identifier (HW, SW, Profile, etc . . .) |
| TSI | Transport Session Identifier. Uniquely identify a FLUTE session for a given IP source address |
| TOI | Transport Object Identifier |
| File-Name | Identification and location of the file to download e.g. URI |
| File-Length | Size of the file |
| File-Digest | Hash of the file (e.g. SHA1 . . .) |
| File-Block-Length | Size of a block |
| File-Block-Digests (one per block) | Hash of the blocks (SHA1 . . .) |

TABLE 1-continued

| Name | Description |
|---|---|
| Meta-Info-Digest | |
| Meta-Info-Digest | Hash of the Meta-Information (e.g. MD5, SHA1 . . .) |

The Meta-Info-Digest field can be used to transmit a RSA signature to allow for authenticating the meta-information file.

The method for file download is then as follows, as described in FIG. 3:

Step S1. The STB 1 sends a request for a chosen content to the Indexing server.

Step S2. The Indexing server responds to the STB with the address of a peer STB 2 capable of providing the meta-information of the content. Of course the Indexing server might provide the address of several peers.

The STB 1 initiates a connection with the indicated peer, Step S3. It retrieves the meta-information file at Step S4, verifies its integrity at Step S5, stores this file and notifies the Indexing server of the meta-information reception, Step S6. The STB 1 keeps this file in memory until the content associated with it is deleted.

With this meta-information file, the STB can request any byte range of a block from other peers and verify the integrity of the received data. After the STB has received the meta-information file, it can download one or more files or blocks of one or more files.

The STB requests one block from the Indexing server, Step 7. Of course, the STB may request several blocks at the same time. It sends the block number and the file identifier (this may be the file name); the file ID is necessary when several files are downloaded concurrently.

The Indexing server returns an address of a peer capable of providing the block of the content, Step 8.

The STB initiates a connection with the indicated peer(s), Step 9, retrieves the block(s) of content, Step 10, and verifies its/their integrity, Step 11.

The STB indicates the status of the block download in terms of success or failure to the Indexing server, Step 12.

The client may send new requests for other blocks to the Indexing server until it has downloaded the complete content.

Using the information given in the reports that it receives from the STBs, the Indexing Server continuously updates its database. At any given moment, it is capable of putting an STB which needs data recovery in relation with a peer STB capable of providing the missing information.

Thanks to the TSI and TOI fields the terminal may switch seamlessly to the push mode for downloading the file.

Figure 3:
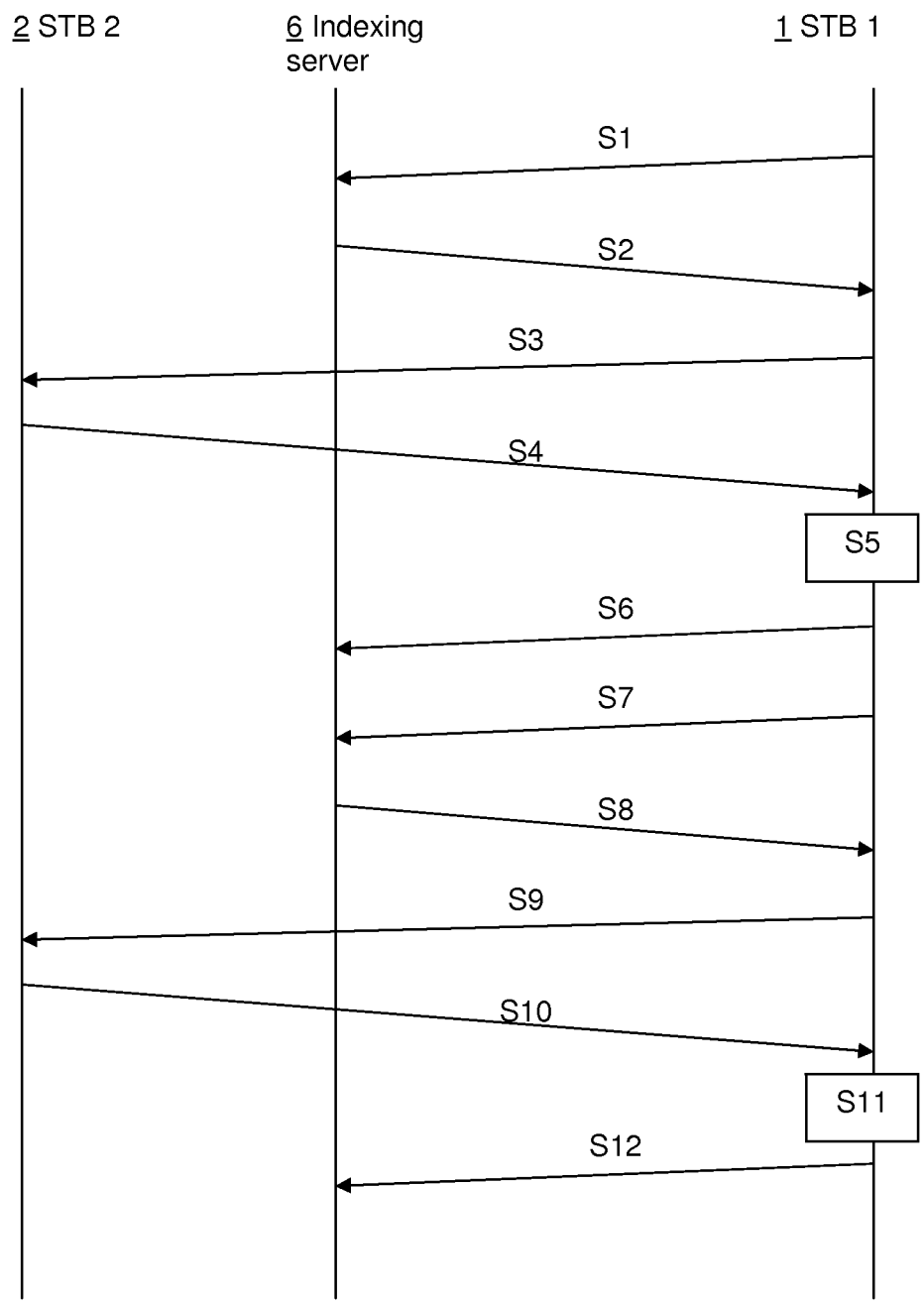
FIG. 3 is a flow chart illustrating the pull mode.

In FIG. 3, the peer that provides the block of the content is the same as the peer that provides the meta-information of the content. Of course this could be another peer.

Moreover, the Indexing server could return the address of more than one peer capable of providing the block of the content. The STB would then possibly connect to more than one peer.

An Indexing server might have information that the requested content or meta-information file can not be provided by any of the peer STBs.

In that case it can provide the address of a Content Server capable of delivering the content directly. In order to avoid flooding the Content Server with requests for content, the Indexing Server may serve only a pool of peer STBs. It puts the other STB on hold and later indicates to them the addresses of the pool of peer STBs which have successfully downloaded the content.

Alternatively, the Indexing Server can address the request to another Indexing Server or to a "Super" Indexing Server. If it finds the requested information, the Indexing Server can store the information in its database and reply positively to the STB.

An Indexing Server may provide several addresses for the same content. The content may be spread over several peer STBs, i.e. none of the peer STBs has the entire content but the total content can be constructed from the partial contents residing on the peer STBs. The Indexing Server may also indicate alternative peer STBs that can provide the requested content as a whole or partially, to give the STB the opportunity to retrieve content from another peer if it finds that the download speed is too low or if the peer is proven to be unavailable.

On the other hand an Indexing Server can be fed with algorithms that allow for an intelligent peer selection for example based on statistics over the number of successful downloads from a peer.

The method for push distribution is now described. The push distribution is based on the File Delivery over Unidirectional Transport protocol, noted FLUTE, as specified in the RFC 3926. The push distribution comprises a recovery mechanism that uses the peer-to-peer mechanism described hereinabove.

FLUTE protocol defines multicasting objects transmission and associated descriptor tables. It defines a File Delivery Table noted FDT, which contains information of the files which have to be transmitted in the current session. FLUTE protocol transmits the FDT from the content server in a multicast mode to all the STB. FLUTE defines several transmit modes such as one complete FDT followed by multiple files or series of FDT instances (intermediate FDTs) followed by their associated files. The latter is especially suited for the transmission of huge video files; it allows a receiver to be able to verify if an object, or a file, has been received correctly, before the session end is reached. The former transmission mode is rather convenient in an environment where small files are transmitted. A complete FDT is built from all FDT instances of the same session.

According to the embodiment, the FLUTE FDT comprises the specific Peer to Peer meta-information (comprising block length and block hash) as indicated in the following table 2. It is then possible during a content download to switch seamlessly from one protocol to the other. Indeed the receivers that haven't downloaded the content completely or totally at the end of a FLUTE multicast push session, can switch seamlessly to the Peer to Peer pull mode and download the missing blocks thanks to the information in the FDT which allows them to know exactly the missing blocks of the content. Similarly a receiver which has begun to download content by means of the Peer to Peer pull mode can switch seamlessly to a push mode using the FDT which gives the receiver the necessary information to recover the missing blocks of file with the push mode.

The following table represents the FLUTE File Delivery Table including P2P meta-information according to the embodiment.

TABLE 2

| Element/Attribute Name | Element/Attribute Description |
| --- | --- |
| FDT-Instance-Attributes | Common Attributes for all the files described by the FDT instance |
| Expiration-Time | FDT Instance Expiration time |
| Send-Complete | Describe if FDT instance is complete or not (e.g. describe all the files to be delivered in the session) |
| Multi-Files-Delivery-Attributes | Attributes related to the delivery of the multi-files |
| FEC-OTI-FEC-Encoding-ID | Identification of FEC algorithm |
| FEC-OTI-FEC-Instance-ID | FEC instance depending on the FEC algorithm identification |
| FEC-OTI-Maximum-Source-Block-Length | The maximum number of source symbols per source block |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source block |
| Multi-Files-Attributes | Attributes related to the multi-files |
| Content-Type | Files content Type |
| Content-Encoding | Compression . . . |
| Client-Id | To target the content download depending on client identifier (HW, SW, Profile . . .) |
| Content-Block-Length | Size of a block |
| Content-Block-Digests (one per block) | Hash of the blocks (SHA1 . . .) |
| Download-File-Attributes (one per file) | |
| File-Delivery-Attributes | Attributes related to the delivery of the file |
| TOI | Transport Object Identifier |
| Transfert-Length | Size of the transport object carrying the file |
| Bandwidth-Requirement | Aggregate rate of sending packets to all channels |
| FEC-OTI-FEC-Encoding-ID | Identification of FEC algorithm |
| FEC-OTI-FEC-Instance-ID | FEC instance depending on the FEC algorithm identification |
| FEC-OTI-Maximum-Source-Block-Length | The maximum number of source symbols per source block |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source block |
| File-Attributes | Attributes related to the file itself |
| File-Type | MIME media type of file |
| File-Encoding | Compression |
| Client-Id | To target the file download depending on client identifier (HW, SW, Profile . . .) |
| File-Name | Identification and location of the file to download e.g. URI |
| File-Length | Size of the file |
| File-Digest | Hash of the file (e.g. MD5, SHA1 . . .) |
| File-Block-Length | Size of a block |
| File-Block-Digests (one per block) | Hash of the blocks (SHA1 . . .) |
| FDT-Instance-Digest | |
| FDT-Instance-Digest | Hash of the FDT instance (e.g. MD5, SHA1 . . .) |
| FDT-Complete-Digest (only in the last FDT instance) | |
| Complete-FDT-Digest | Hash of the complete FDT (e.g. MD5, SHA1 . . .) |

The Content-Block-Length, Content-Block-Digests, File-Name, File-Length, File-Digest, File-Block-Length and File-Block-Digests fields are the minimal meta-information necessary for a P2P protocol. A file is chopped into several blocks.

The Complete-FDT-Digest field can be used to transmit a RSA signature to allow for authenticating the complete FDT.

In order to download content with a push method, a client performs a push content download session discovery phase. A client STB subscribes to a push download offering. As part of the subscription it obtains the distribution address where the signalization of the service is transmitted by the SD&S server, through the DVB-IP/SD&S mechanism. The STB then listens to the dedicated multicast address. It finds a DVB-IP content download offering record.

In this content download offering record it finds the begin and end date/time of the content download session, as well as other information such as the multicast address and ports on which the content is distributed and the address of the indexing server on which it depends. The SD&S record file according to the embodiment is indicated in the following table 3.

TABLE 3

| Element/Attribute Name | Element/Attribute Description |
| --- | --- |
| @DomainName | An internet DNS domain name registered by the Service Provider that uniquely identifies the Service Provider |
| @Version | Version of the DVB-IP Offering record, the version number shall be incremented every time a change in the DVB-IP Offering record is made |
| ContentDownloadOffering type (one per Content Download services list): | ContentDownloadServiceDiscovery/ContentDownloadServiceList |
| Catalogue@Id | This Id is allocated by the Service Provider |
| Name | Name of the Content Download offering catalogue for display in one or more languages; one name is allowed per language code, and at least one language shall be provided (though not necessarily more than one) |
| Description | Description of the Content Download general offering catalogue for potential display in one or more languages; one description per language code |
| ContentReleaseTime | Date and time when the new content is available to be swapped with the old content |
| ClientId | To target the content download session depending on the client identifier. This one can include client hardware version, client software version, client profile, regionalization . . . Also specified in the FDT to target specifically each download file depending on the user profile |
| ServiceLocation type (one per Content Download Service e.g. Session) | The location where the Content Download Service may be found |
| ProtocolType | FLUTE or Other |
| Transport Session Identifier (TSI) | Uniquely identify a FLUTE session for a given IP source address |
| IPMulticastAddress@Source | One IP sender address per content delivery session |
| IPMulticastAddress@Address | Multicast address |
| Number of Channels in the session | Use of multiple LCT channels to deliver the content in a single FLUTE session |
| IPMulticastPort number for each channel in the session | Port number corresponding to each channel number |
| Start data and time of the content delivery session | Start date and time of the Multicast Content Delivery Session |
| End date and time of the content delivery session | End date and time of the Multicast Content Delivery Session |
| FLUTE packet Reception timeout | Time to receive at least one FLUTE packet at session level |
| File Delivery Table (FDT) reception timeout | Time to receive at least one FDT instance at session level |
| Object (e.g. file) reception timeout | Time to receive at least one File at session level |
| BandwidthRequirement | Max Bandwidth to be used by the session |

TABLE 3-continued

| Element/Attribute Name | Element/Attribute Description |
|---|---|
| RecoveryMode type | Information regarding recovery mode |
| P2P IndexServer URI | Identification and location of the P2P Index Server (URI) |
| P2P IndexServerBackup URI | List of index backup servers URI |
| Current Session File Repair OffsetTime | The time that a client shall wait after the end of the file delivery or a content delivery session (depending of the FLUTE transmit mode) to start the file recovery procedure |
| Current Session File Repair RandomTimePeriod | The time window length over which a client shall calculate a random time for the initiation of the file recovery procedure |
| Integrity type | |
| AnnouncementDigest | Digest of the announcement (Hash, CRC . . .) |

The AnnouncementDigest field can be used to transmit a RSA signature to allow for authenticating the announcement.

Figure 4:
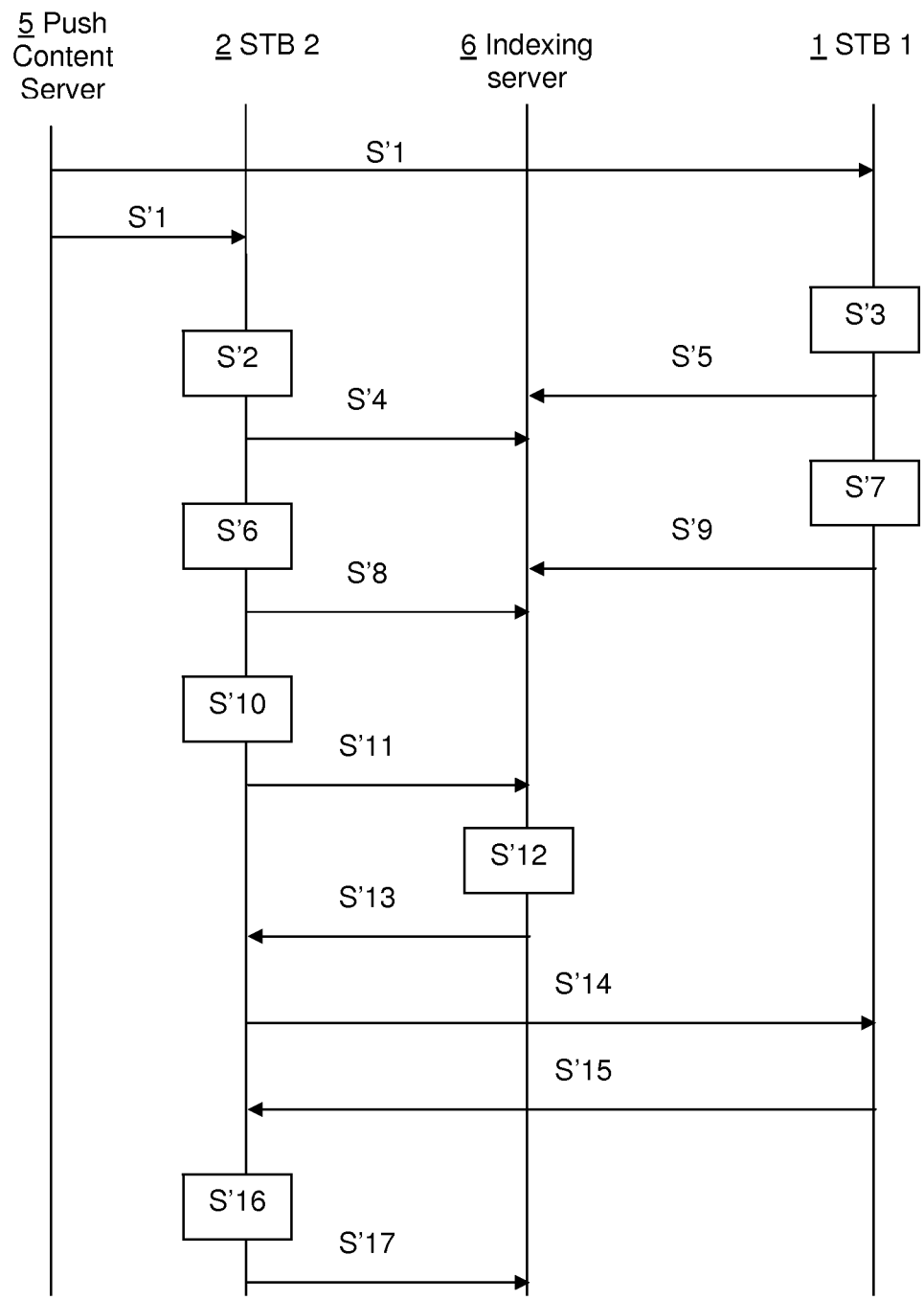
FIG. 4 is a flow chart illustrating a combination of the push and pull modes.

As illustrated in the FIG. 4, using the information acquired in the discovery phase, an STB listens to the multicast address on which the push session content is distributed, step S'1.

Each FDT instance contains several hash codes which allows for verifying its own integrity and the integrity of the blocks of the file associated with it. This information corresponds to the meta-information file as described for the pull mode. As for the pull mode, the STB stores the meta-information file as long as it keeps the associated content. The file can then be used afterwards to serve peers in pull mode.

The STB detects when a file delivery ends, by means of the "End-Of-Transmission-File" flag of the FLUTE protocol. From that moment, each STB can verify the integrity of the FDT instance, step S'2, S'3. After this verification each STB sends a message to the indexing server that indicates if it has received the FDT instance, steps S'4, S'5.

If the integrity check of the FDT instance succeeds, then the STB verifies the integrity of the blocks of the file associated with the FDT instance (steps S'6, S'7) and sends a report to the Indexing Server for the associated file, steps S'8, S'9; this report contains information about the blocks that were received correctly as well as the file identifier. The Indexing Server stores this information and updates its database. For the part of the files that are missing, an STB performs a file recovery, as described hereafter.

If the integrity check of the FDT instance fails, a corrupted FDT instance does not allow the STB to verify the integrity of the blocks of the file associated with it, because this information is contained in the FDT instance. The STB stores the file that follows the corrupted FDT, and waits for the detection of the end of file delivery to start a FDT instance reparation as described hereinafter. The FLUTE packets containing a block include an identifier called TOI, which is unique for each file. An FDT also contains this identifier, which allows relating blocks to a file.

The last FDT instance of the session contains also a hash code calculated over the total of all FDT instances that are part of the session. This allows for verification of the integrity of the complete FDT and for knowing if FDT instances are missing. This can be used to detect the case where an FDT instance is delivered only by one FLUTE packet and this packet is dropped.

The STB detects when a session ends, by means of an end-of-session time/date that is included in the session signalization record or by means of the "End-Of-Session" flag provided in the FLUTE packet header.

Each STB therefore verifies the integrity of the complete FDT which is the sum of all FDT instances received; it then verifies if the complete FDT is corrupted or if some FDT instances are missing. If the complete FDT is not corrupted it may still be necessary to activate a recovery process for some files, depending on their reception state. On the other hand, if the complete FDT is found to be corrupted an STB sends a message to the Indexing Server indicating a request for a complete FDT, after which it verifies if a recovery process is needed for corrupted files.

Push content that was missed or damaged can be recovered within a normal pull mode phase as described hereinabove.

If an integrity check on the complete FDT or on a FDT instance fails step S'10, then the STB sends a message to the Indexing Server indicating a request for a complete FDT (respectively a FDT instance, as illustrated in the FIG. 4).

Since the Indexing Server is not supposed to have any knowledge of FLUTE, the following applies to allow retrieving a complete FDT (respectively an FDT instance):

The STB keeps the complete FDT and FDT instances in memory for a certain period, in particular up to the downloading of new contents in a new session. It reports the correct reception of this complete FDT (respectively the FDT instance) to the Indexing Server.

The STB who has a corrupted complete FDT (respectively a corrupted FDT instance, can interrogate the Indexing Server (step S'11) which provides addresses of peers capable of sending an uncorrupted version, step S'12, S'13.

The STB can retrieve an uncorrupted complete FDT (respectively an uncorrupted FDT instance) step S'14, S'15, S'16, S'17 with its hash value. It verifies its integrity. It analyzes the complete FDT to identify which files of the push session it missed or to repair corrupted FDT instance. Then it verifies the integrity of the associated file. If the STB detects a missing file, it starts a file recovery for the missing file. If the STB detects a corrupted file, it starts a block recovery.

Using the information given in the reports that it receives from the STBs, the Indexing Server continuously updates its database. At any given moment, it is capable of putting an STB which needs data recovery in relation with a peer STB capable of providing the missing information.

Thanks to the session duration given by session announcement in the SD&S record, a STB knows whether it has missed a push session. A STB that has missed a push session can interrogate the Indexing Server for a complete FDT with file name "FDT", and proceeds with a file recovery for the missing files.

A STB that connects when a file delivery session is ongoing is still able to get a part of the content from the FLUTE multicast session. To obtain the files missed in the FLUTE session, it waits for the end of the session to perform a "complete" FDT recovery and obtain the missing files from peers.

In an environment of video file download, the combination of pull and push methods provides enhanced distribution model. A distribution policy may be as follows. Movies which are relatively popular can be proposed in push mode, where other movies which are less demanded can be proposed in pull mode. When the set of push mode movies is replaced by a new one, the old set joins the set of movies available in pull mode.

On the other hand, Indexing Servers can indicate to Content Servers that it is interesting to switch the delivery mode of some movies from pull to push mode or vice versa, according to statistics on demands that Indexing Servers are capable of gathering.

For a monitoring or managing entity, Indexing Servers offer the possibility to collect statistics about the file recovery activity. This information is used by an operator for monitoring or for adapting the delivery strategy dynamically. The latter may consist in planning an extra session of push delivery or adding FEC. Other actions may include changing the bandwidth allocated for download file delivery.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method for downloading content in a communication system comprising a first terminal, at least a second terminal, and a content server, said method comprising, at the level of the first terminal:
   downloading content in a pull mode from said content server or the at least said second terminal and receiving information related to the download of said content in a push mode; and
   switching from the pull mode to the push mode and continuing downloading said content in the push mode, without having to request any further information, when said push mode starts at said content server.

2. The method according to claim 1, further comprising:
   receiving the pull content according to a peer-to-peer protocol; and
   receiving a peer-to-peer meta-information file comprising information allowing switching to the push mode.

3. A method for downloading content in a communication system comprising a first terminal, at least a second terminal, and a content server, said method comprising, at the level of the first terminal:
   downloading content in a push mode from said content server and receiving information related to the download of said content in a pull mode; and
   switching from the push mode to the pull mode and continuing downloading said content in the pull mode from said content server or the at least said second terminal, without having to request any further information, when said pull mode is available.

4. The method according to claim 3, further comprising:
   receiving the push content in a session delivery according to a FLUTE protocol; and
   receiving information in a File Delivery Table, FDT, during the session delivery allowing to switch to the pull mode.

5. The method according to claim 4, further comprising:
   verifying the integrity of a FDT instance;
   indicating to an indexing server whether the FDT instance has been successfully received or not; and
   indicating to said indexing server whether a file associated with the FDT instance has been successfully received or not.

6. The method according to claim 5, further comprising, when detecting a corrupted FDT instance:
   waiting for the end of a file delivery; and
   performing a FDT instance reparation in the pull mode.

7. The method according to claim 5, further comprising, when detecting a corrupted complete FDT:
   waiting for the end of session delivery; and
   performing a complete FDT reparation in the pull mode.

8. A terminal comprising:
   a processor coupled to a memory;
   the processor configured:
      to download content in a pull mode, and to obtain information related to the download of said content in a push mode, and when said push mode is available at a content server, without having to request any further information, said processor stops the download in said pull mode of said content, partially downloaded, and
      to download, in said push mode, part of said content not already downloaded when said push mode is available at said content server, without having to request any further information, said processor starts to download in said push mode.

9. A terminal comprising:
   a processor coupled to a memory;
   the processor configured:
      to download content in a push mode, and to obtain information related to the download of said content in a pull mode, and when said pull mode is available at a content server or at least a second terminal, without having to request any further information, said processor stops the download in said push mode of said content, partially downloaded, and
      to download, in said pull mode, part of said content not already downloaded when said pull mode is available, without having to request any further information, said processor starts to download in said pull mode.

* * * * *